G. F. Quick.
Harvester Cutter.
No. 43602. Patented July 19 1864.
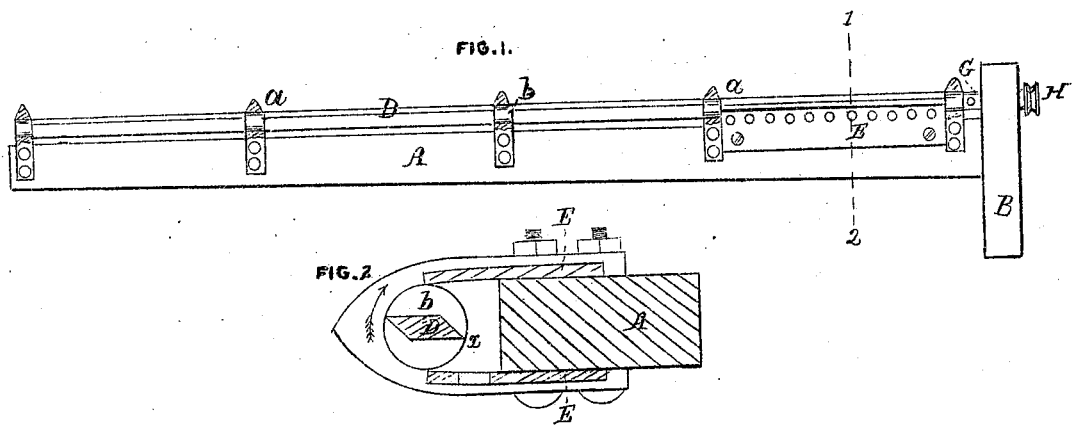
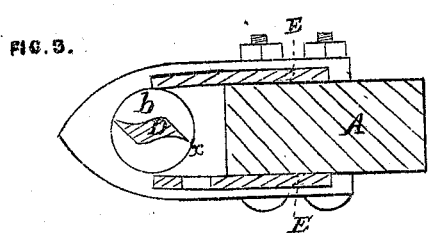
Henry Howser
Atty for G. F. Quick
Witnesses

UNITED STATES PATENT OFFICE.

GEO. F. QUICK, OF PHILADELPHIA, PENNSYLVANIA.

IMPROVEMENT IN THE CUTTING APPARATUS OF HARVESTERS.

Specification forming part of Letters Patent No. 43,602, dated July 19, 1864.

*To all whom it may concern:*

Be it known that I, G. F. QUICK, of Philadelphia, Pennsylvania, have invented certain Harvester-Cutters; and I do hereby declare the following to be a full, clear, and exact description of the same, reference being had to the accompanying drawings, and to the letters of reference marked thereon.

My invention consists, first, in a longitudinal knife having hubs arranged, as described hereinafter, for turning in and for being withdrawn from certain finger-bearings; secondly, in the combination of the longitudinal knife with an upper and a lower plate, whereby the stalks of grain are prevented from being carried round with the knife, and the cutting-edges of the latter are protected from injury by stones or other hard substances.

In order to enable others skilled in the art to make and use my invention, I will now proceed to describe its construction and operation.

On reference to the accompanying drawings, which form a part of this specification, Figure 1 is an inverted plan view of my improved harvester-cutter; Fig. 2, a transverse section on the line 1 2, Fig. 1; Fig. 3, the same with a modified form of knife, and Fig. 4 another modification of the knife.

Similar letters refer to similar parts throughout the several views.

A represents the cutter-beam, and B part of the frame of a harvester.

To the front edge of the cutter-beam are secured any convenient number of fingers, $a$, which are pointed at the outer extremities, and in each of which is bored a circular hole for receiving one of the hubs or journals $b$, of which there are as many as there are fingers.

The knife D, as seen in Figs. 1 and 2, consists of a long strip of steel on which are formed two cutting-edges, $x\ x$, the above-mentioned hubs or journals being secured to the strip by brazing or otherwise.

To the cutter-beam are also secured the upper and lower guard-plates, E and F, the outer edges of which are as near to the range of the cutting-edges of the revolving knife as possible without being in actual contact therewith. (See Fig. 2.)

In the portion B of the framework of the harvester turns a spindle, G, one end of which is furnished with a socket for the reception of the end of the knife, which is secured to the spindle in the present instance by a pin, the other end of the spindle being provided with a pulley, H, to be driven by a band or belt from the driving-gear of the harvester; or in place of a driving-belt any suitable system of gearing may be employed for imparting the desired rotary motion to the knife in the direction of the arrow, Fig. 2.

As the harvester is drawn over the ground the edges of the rapidly-revolving knife sever the stalks of grain or grass, which fall onto the cutter-beam A, or onto a platform attached thereto, and are directed thence to the ground in the usual manner.

The fingers $a$, being pointed at the end, divide the grain or grass in the same manner as the ordinary harvester-fingers.

The upper guard, E, prevents the stalks of grain or grass from being carried round with the knife, and the lower guard, F, protects the knife from being injured by stones and other hard substances. The lower guard is perforated, so that any particles of dirt which may gain access to the space between the two guards may be discharged onto the ground.

When the knife becomes blunt it can be readily withdrawn longitudinally from the finger-bearings $a$, after the pin which connects it to the spindle G has been removed.

Fig. 3 represents a modification of the knife, which will be readily understood without description; and Fig. 4 illustrates a spiral knife arranged to revolve in the finger $a$.

I wish it to be understood that I do not desire to claim, broadly, the use, in harvesters, of revolving cutters, or the use of spiral cutting-edges; but

I claim as my invention and desire to secure by Letters Patent—

1. A longitudinal knife, D, having hubs $b$ arranged for turning in and for being withdrawn from the fingers $a$, as set forth.

2. The combination of the longitudinal knife D with the upper plate, E, and lower perforated plate, F, the whole being arranged as and for the purpose described.

In testimony whereof I have signed my name to this specification in the presence of two subscribing witnesses.

GEO. F. QUICK.

Witnesses:
 JOHN WHITE,
 CHARLES HOWSON.